No. 848,652. PATENTED APR. 2, 1907.
A. J. HUGHES.
UNIVERSAL JOINT FOR SHAFTS AND RODS.
APPLICATION FILED FEB. 19, 1906.

UNITED STATES PATENT OFFICE.

ARTHUR J. HUGHES, OF PEARL RIVER, NEW YORK.

UNIVERSAL JOINT FOR SHAFTS AND RODS.

No. 848,652.     Specification of Letters Patent.     Patented April 2, 1907.

Application filed February 19, 1906. Serial No. 301,837.

*To all whom it may concern:*

Be it known that I, ARTHUR J. HUGHES, a citizen of the United States, and a resident of Pearl River, in the county of Rockland and State of New York, have invented certain new and useful Improvements in Universal Joints for Shafts and Rods, of which the following, taken in connection with the accompanying drawings and the reference characters marked thereon, is a full, clear, and exact specification, sufficient to enable others skilled in the art to make and use my invention.

This invention relates to that class of devices called "universal joints" and intended for the purpose of uniting sections of shafts or rods to permit the sections to incline or to be inclined in any direction with reference to each other and within suitable limits for the purpose of transmitting power or for other useful mechanical purposes, as is well understood.

The object of my invention is to provide or produce a simple, cheap, and efficient form of universal joint for shafts and rods which will accomplish all the purposes in the matter of permitting the relative indications of the coupled sections and which will, moreover, be amply strong and durable, not liable to become disarranged or unjointed, and which will be simple and easy to manufacture and easy to apply.

To accomplish all of the foregoing and to secure other and further advantages in the matters of construction or manufacture, operation, application, and use, my improvements involve certain new and useful peculiarities of construction and relative arrangements or combinations of parts, as will be herein first fully described and then pointed out in the claims.

In the accompanying drawings, forming part of this specification, Figure 1 is a side view showing the ends of two sections of a shaft or rod, the same being coupled one to the other with my improved form of joint and ready for use as may be desired. Fig. 2 is a vertical section on a plane through line 2 2 of Fig. 1 and looking in the direction of the contiguous arrow. Fig. 3 is a sectional elevation of the central block detached, showing one form which it may assume when in unfinished condition; and Fig. 4 is a similar view of the same in finished condition.

In all these figures like letters of reference wherever they occur indicate corresponding parts.

A and B represent the end portions of two similar sections of a shaft or rod, but these need not be of the same diameter and of the same contour, although they are ordinarily so made. The section A has two ears $a\ a$, and the section B has two similar ears $b\ b$, these being of length to nearly overlap the central block on opposite sides and being each recessed or cut away on their margins, as indicated, to afford sufficient relative movement of the two sections A and B for the inclination of these parts with respect to each other.

The central block C is made rectangular on the outside and preferably with equal faces, as indicated; but if one of the sections A or B is larger than the other then the proportions of the block may be modified accordingly.

The ears $a$ and $b$ are hinged upon the central block, and the axis of the two hinges should pass through the center of the block and at right angles with respect to each other. The hinge pins or rods or rivets should be amply strong and durable, so that the joint may not unnecessarily weaken the shaft or rod. I preferably rivet the hinge-pins in place, so that they cannot become accidentally loosened; and to prepare the block for the reception and introduction of these hinge-pins I form in it a central cavity of sufficient depth, as indicated in Figs. 2, 3, and 4, and perforate it, as at $c$ and $d$, and at right angles to these two perforations, as at $e$. The block may be prepared by first drilling the perforation $e$ throughout its length and afterward reaming to form the cavity with its axis coincident with that of the perforation $e$, as indicated in Fig. 4; but of course the larger cavity may be drilled out, as in Fig. 3, and the perforation in line with the cavity thereafter made, as may be preferred.

To complete the joint, two short hinge-pins $f\ g$ upset on one end only are first introduced through the perforations $c\ d$ and through the ears $a\ a$, being entered from the interior of the cavity, which is large enough for the purpose, and then their outer ends upset or headed over, as indicated. Any suitable tool or device may be introduced into the cavity for the purpose of holding the two pins while their outer ends are being secured.

The longer hinge pin or bolt $h$ is introduced from the exterior through one of the ears $b$ and passes through the other ear, its outer ends being upset or headed over. To afford a firm bearing for this hinge-pin $h$ at the end near the mouth of the cavity, (the other end fitting closely in the perforation $e$,) I closely fit into the open mouth of the cavity a separate cylindrical block D, and this is perforated to permit the pin $h$ to pass through it. The outer face of the block D being located in the plane of the adjacent face of the block C will interfere in no way with the proper movement of the ear upon that face. By use of the block D, I am enabled to secure a perfectly rigid and secure bearing for each end of the hinge-pin $h$, which is of importance.

From the construction and arrangement shown it will be apparent that the two hinges, one being formed by two hinge-pins and the other by a single pin, are of practically equal strength, durability, and rigidity, and thus the improved form of universal joint is made entirely reliable and efficient for the purposes intended.

The improved joint is simple and easy of construction and easy to assemble for use and is found to answer all the purposes or objects of the invention hereinbefore alluded to. In order to uncouple the joint, the long hinge-pin is first displaced by removing one of its heads and driving it out. Then the two parts of the shaft or rod are separated, block D removed, and the hinge-pins $f\,g$ taken out through the cavity in the block C.

Having now fully described my invention, what I claim as new herein, and desire to secure by Letters Patent, is—

1. A universal joint for shafts and rods comprising the two furcated sections of the shaft, each provided with ears recessed at their margins and registering apertures, a recessed central block having apertures through opposite sides to receive short pins for hinging one section thereon and a perforated block fitted into the central block for receiving the long pin extending through the central block for hinging the other section thereon and pins adapted for hinging the sections to the central block, substantially as shown and described.

2. In a universal joint for shafts and rods, a central recessed block, hinge-pins extending through two opposite sides thereof, a removable perforated bearing-block located in the cavity of the central block and a hinge-pin extending through the bearing-block and one side of the central block, in combination with the furcated sections having ears recessed at the margins of the shaft, substantially as shown and described.

3. The herein-described universal joint for shafts and rods, comprising a central block perforated and provided with a cavity as set forth, separate hinge-pins located at right angles with respect to each other and entering said cavity, and a removable perforated block located in the cavity and affording a bearing for one of the hinge-pins, the whole being constructed and arranged substantially as shown and described.

In testimony whereof I have signed my name to this specification in the presence of two subscribing witnesses.

ARTHUR J. HUGHES.

Witnesses:
 WM. A. SEIDERO,
 MAGGIE A. HUGHES.